United States Patent

Paitson et al.

[11] 4,114,723
[45] Sep. 19, 1978

[54] PNEUMATIC SEISMIC SIGNAL GENERATOR WITH INDEPENDENT FIRING CONTROL PRESSURE

[75] Inventors: John Lloyd Paitson, Galveston; Marion Lonnie Parker, Houston, both of Tex.

[73] Assignee: Western Geophysical Co. of America, Houston, Tex.

[21] Appl. No.: 749,548

[22] Filed: Dec. 10, 1976

[51] Int. Cl.$^2$ .................................................. G01V 1/38
[52] U.S. Cl. ...................................... 181/120; 181/119
[58] Field of Search .................... 181/107, 119, 120

[56] References Cited

U.S. PATENT DOCUMENTS

| | | | |
|---|---|---|---|
| 3,638,752 | 2/1972 | Wakefield | 181/120 |
| 3,653,460 | 4/1972 | Chelminski | 181/120 |
| 3,670,840 | 7/1972 | Gundlach | 181/117 |
| 3,750,097 | 7/1973 | Havlik et al. | 181/115 |

*Primary Examiner*—Howard A. Birmiel
*Attorney, Agent, or Firm*—William A. Knox

[57] ABSTRACT

An air actuated seismic signal generator, commonly termed an air gun includes a cylindrical casing that is divided into a control chamber and a firing chamber by a sliding valve. The end face of the sliding valve that is exposed to the control chamber has a greater area than the end face exposed to the firing chamber. An air exhaust port is provided in the firing chamber; the exhaust port may be opened or closed by sliding the valve away from or towards a seat that is associated with the exhaust port. Air is admitted to the control chamber at a relatively low pressure of about 500 psi, and holds the valve in the exhaust-port-closed position because of the differential forces on the valve end faces. The firing chamber is pressurized to a relatively high pressure of about 5000 psi by a separate air supply. There is no air communication or equalization between control and firing chambers. When some of the air in the control chamber is dumped, the differential forces are upset and the sliding valve moves away from the exhaust port seat, to impulsively release the air in the firing chamber. As the piston moves away from the seat, it momentarily compresses the air remaining in the control chamber. The compressed air acts like a spring, absorbs the motion of the valve and bounces the valve back towards the exhaust port seat. At the same time a fresh supply of control air is admitted to the control chamber to finally push the valve closed again. The amount of air remaining in the control chamber and hence the "resiliency" of the air spring can be set by means of calibrated orifices in the air dump line.

5 Claims, 6 Drawing Figures

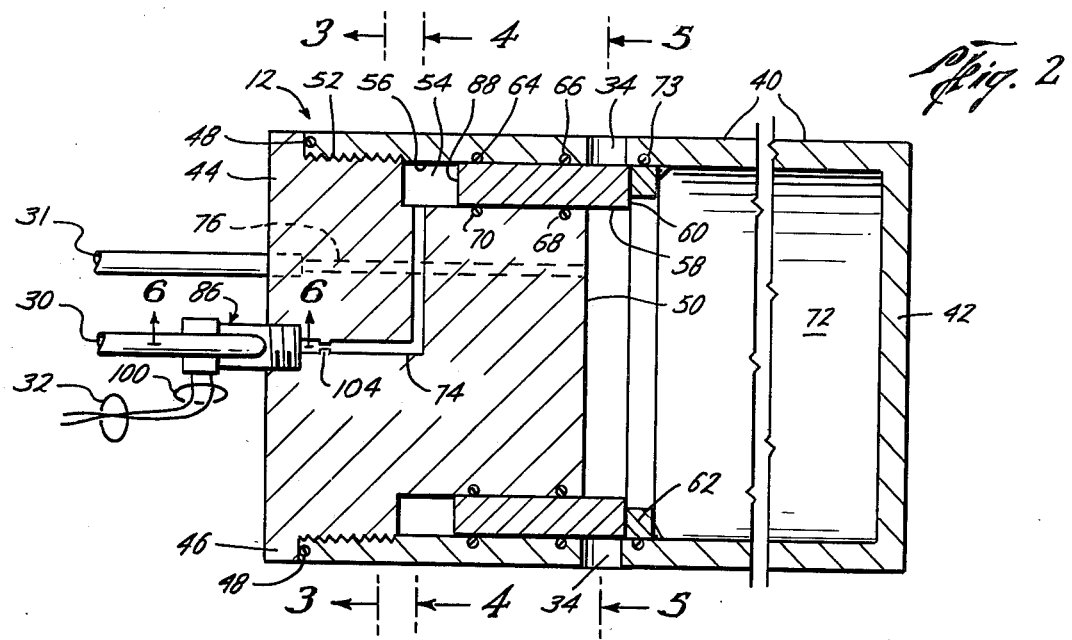
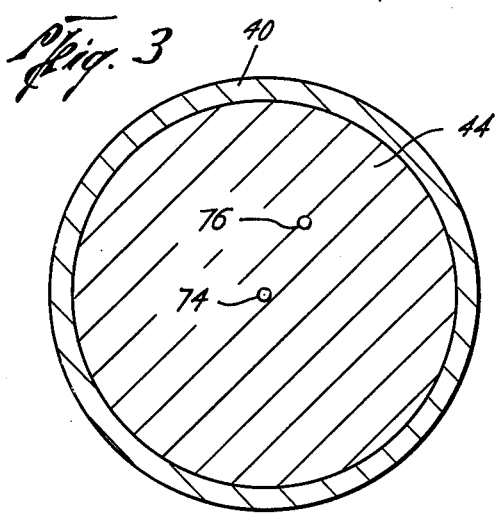
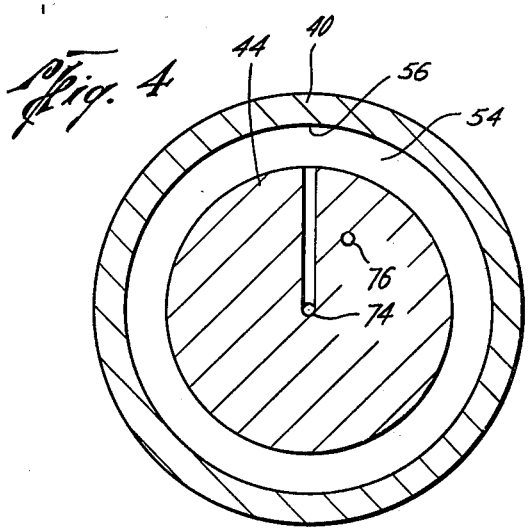
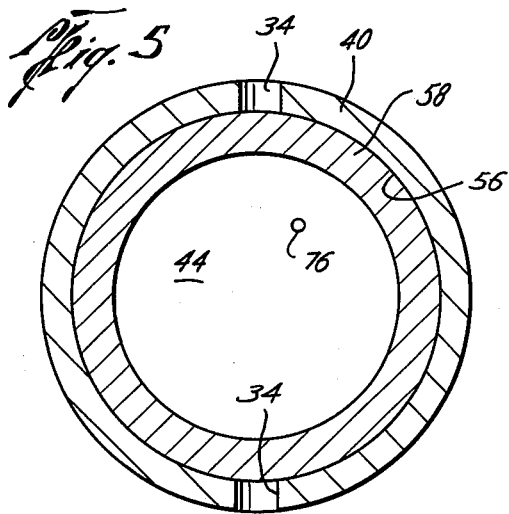
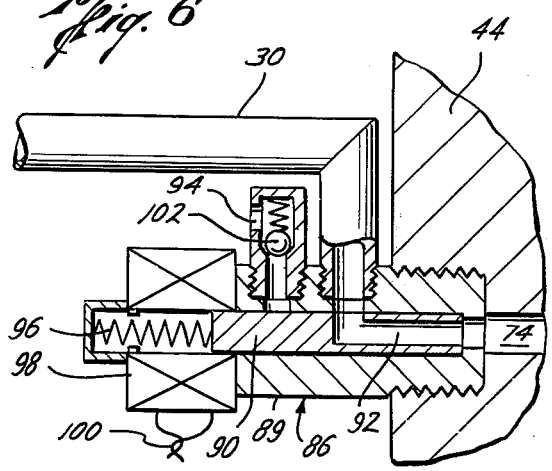

PNEUMATIC SEISMIC SIGNAL GENERATOR WITH INDEPENDENT FIRING CONTROL PRESSURE

BACKGROUND OF THE INVENTION

Relation to Other Inventions

This application is related to U.S. patent application Ser. No. 749,547. For "Method and Apparatus for Determining the Firing Instant of a Seismic Sound Source", Inventor: Hendrik Osseweijer, assigned to the assignee of this application, filed on the same date as this application.

Field of the Invention

This invention relates to high-pressure, pneumatic air guns as used for an acoustic sound source in marine seismic exploration.

Relation to the Prior Art

In seismic exploration, and particularly in marine exploration, pneumatic air guns are used to generate a seismic impulse. Acoustic waves, generated by the impulse, travel downwardly through the water and into the earth beneath. The acoustic waves are reflected from subsurface earth layers and return to the water surface where they are detected by sensitive hydrophones as analog signals. The electrical analog signals are transmitted to a signal processing and recording apparatus mounted in an attendant ship. The travel time of the acoustic waves, from the instant that the gun is fired, until the waves are detected as reflections by the hydrophones, is a measure of the depth to the various earth layers. Because it is necessary to measure the earth-layer depths accurately, it is necessary to know the exact instant that the gun was fired to within at least a millisecond.

Air guns of the explosive or impulsive type in common use, all work on the same basic principle although the construction details may differ. In general, an air gun has two high pressure chambers, an upper control chamber and a lower firing chamber. The firing chamber is provided with one or more exhaust ports, which, in the rest position, are sealed by a sliding sleeve valve or by a shuttle valve. Both types of valve have two faces. One face of the valve that is exposed to pressurized air in the control chamber has an area greater than the other valve face that is exposed to the pressurized air in the firing chamber. When the pressure of the air in both chambers is equalized, the differential forces on the opposite end faces of the valve hold the exhaust port closed. When it is desired to fire the gun, a solenoid valve opens and drops the control air pressure, thereby upsetting the differential forces on the two opposing valve faces. The sleeve or shuttle valve then abruptly opens the exhaust port to allow the air in the firing chamber to escape explosively.

Reference is made to U.S. Pat. No. 3,638,752 for a description of an air gun using a sleeve-type sliding valve. In particular, refer to FIGS. 11, 14, and 15 of the patent which illustrate typical mechanical constructions of the gun as actually used commercially. An example of an air gun employing a shuttle valve is disclosed in U.S. Pat. No. 3,276,534.

Although there is an advantage to using a single air supply for both control and firing chambers, there are many disadvantages aside from the mechanical complexity of the gun.

Because of the very high air pressures involved, the solenoid dump valve must be specially built. Second, the solenoid valve seat must be very small in order to reduce the mechanical force acting against the solenoid valve stem. Third, the pressure equalization lines between control and firing chambers are necessarily quite restricted. In one commercial embodiment in present use, the control-air dump valve is a complex two-stage device: An electrically operated solenoid valve upsets the forces on a differential-area, air-actuated pilot valve. The pilot valve in turn, upsets the differential forces across the main exhaust valve to trigger the air gun. Use of a pilot valve is necessary to reduce the forces acting against the stem of the solenoid valve. The additional valving of course contributes to increased gun maintenance.

Because of their small diameter, the solenoid valve stages and the pressure equalization lines are easily clogged with dirt, causing the gun to jam. During a seismic exploration operation using the gun, the gun must be frequently disassembled for cleaning, thus seriously delaying the progress of the exploration crew.

Another disadvantage is the use of metal-to-metal sleeve-valve seats. If the sleeve valve becomes slightly misaligned, it will not seal. Dirt between the valve seats similarly contributes to malfunctions.

Finally, in conventional air guns, at first glance, the instant of application of an electric pulse to the solenoid dump valve might be taken to be the gun firing instant. In practice, however, there may be a variable delay of several tens of milliseconds between pulse application and the actual gun firing instant. To circumvent the variable delay problem, a strong-field hydrophone is clamped externally to the gun, usually 1 to 3 feet from the exhaust port. The hydrophone detects the arrival of the shock wave when the gun fires. The arrival time of the shock wave is taken to be the firing instant. The problem with an external device is, of course, the fact that an external module projecting from the side of the gun, may easily become snagged by debris and adds undesired bulk to the gun assembly.

Reference is now made to U.S. Pat. No. 3,288,244 as being of interest with respect to certain operating principles of applicant's invention. The reference is an air-actuated earth impactor device for generating seismic signals. The reference device includes a housing closed at both ends. The housing is divided into an upper and lower chamber by a dividing plate having an orifice. A piston having upper and lower faces of equal diameters, the diameters being substantially greater than the diameter of the orifice, is slidably mounted for vertical travel within the housing. High pressure air may be admitted to the upper chamber and low pressure air from a separate source is admitted into the bottom of the lower chamber. The device is cocked by shutting off and exhausting the high-pressure air from the upper chamber and admitting low-pressure air to the volume between the lower piston face and the bottom of the lower chamber. The piston is forced upwards by the low pressure-air. The top face of the piston is pressed into sealing engagement with the orifice plate. Consequently, the effective area of the top piston face, equal to the area of the orifice, becomes less than the area of the bottom piston face. With the piston in the cocked position, high-pressure air may be admitted to the upper chamber. The piston will now remain cocked so long as the low-pressure air supply is maintained because of the balance of forces across the two piston faces. The device is fired by exhausting the low-pressure air from the lower chamber to upset the balance of forces across the piston. In the reference, it is to be noted that the low-pressure air cannot of itself cock the piston in the presence of high-pressure air in the upper chamber. The high-pressure air must first be shut off and vented. In order to accomplish the desired results, a number of solenoid valves must be operated in a required sequence by relatively complex control circuitry.

SUMMARY OF THE INVENTION

It is an object of this invention to provide an air gun, for marine seismic exploration, that is mechanically simple and easy to maintain.

In accordance with this invention, the air gun includes a casing closed at both ends, having one or more exhaust ports and an associated valve seat. An exhaust valve assembly sliding inside the casing closes the exhaust port by bearing against the valve seat. Further, the exhaust valve divides the casing into an upper control chamber and a lower firing chamber. The end faces of the exhaust valve, which may be a sleeve valve, have different areas when the valve is closed. The control face or end face exposed in the control chamber has a larger area than the end face exposed in the firing chamber when the valve is closed.

In accordance with an important aspect of this invention, the control chamber is sealed from fluid communication with the firing chamber.

In accordance with another aspect of this invention the air pressure in the control chamber is substantially less than the air pressure in the firing chamber.

In accordance with yet another aspect of this invention the control chamber and the firing chamber are supplied with pressurized air at different pressures and from different sources. In the firing chamber, air is supplied continuously. The flow of control air to the control chamber may be interrupted momentarily during a dump cycle when the gun is fired.

In accordance with a further aspect of this invention, control air is continuously supplied through a two-position, three-way, spring-loaded solenoid valve to the control chamber when the firing chamer is charged with high-pressure air and the valve is in the closed position. The solenoid valve dumps some of the control air when the solenoid is activated, thereby to fire the gun. The control air is dumped to ambient pressure from the control chamber through at least one duct that includes a metering orifice to meter the volume of air released from the control chamber within a known time interval, therby to leave a known amount of residual air in the control chamber.

In accordance with a useful aspect of this invention, the residual air in the control chamber acts as a resilient spring to absorb the momentum of the exhaust valve when the exhaust valve opens, and after firing, to cause the exhaust valve to rebound towards its closed position. Since the metering orifice controls the volume of residual air that can escape during a control-air dump cycle, it provides a means for adjusting the compressive resilience of the residual air.

In accordance with still a further aspect of this invention, the fixed exhaust valve seat is fabricated from a hard plastic material.

BRIEF DESCRIPTION OF THE DRAWINGS

Other objects and advantages will be better understood by reference to the detailed description of a preferred embodiment of this invention and to the drawings in which

FIG. 2 is a cross sectional view of a preferred embodiment of the seismic signal generator in the form of an air gun;

FIG. 3 is a cross section taken along line 3—3 of FIG. 2;

FIG. 4 is a cross section taken along line 4—4 of FIG. 2;

FIG. 5 is a cross section taken along line 5—5 of FIG. 2;

FIG. 6 is a cross sectional view of a three-way, two-position solenoid valve for use with the air gun of FIGS. 1 and 2.

DETAILED DESCRIPTION OF THE INVENTION

Figure 1:
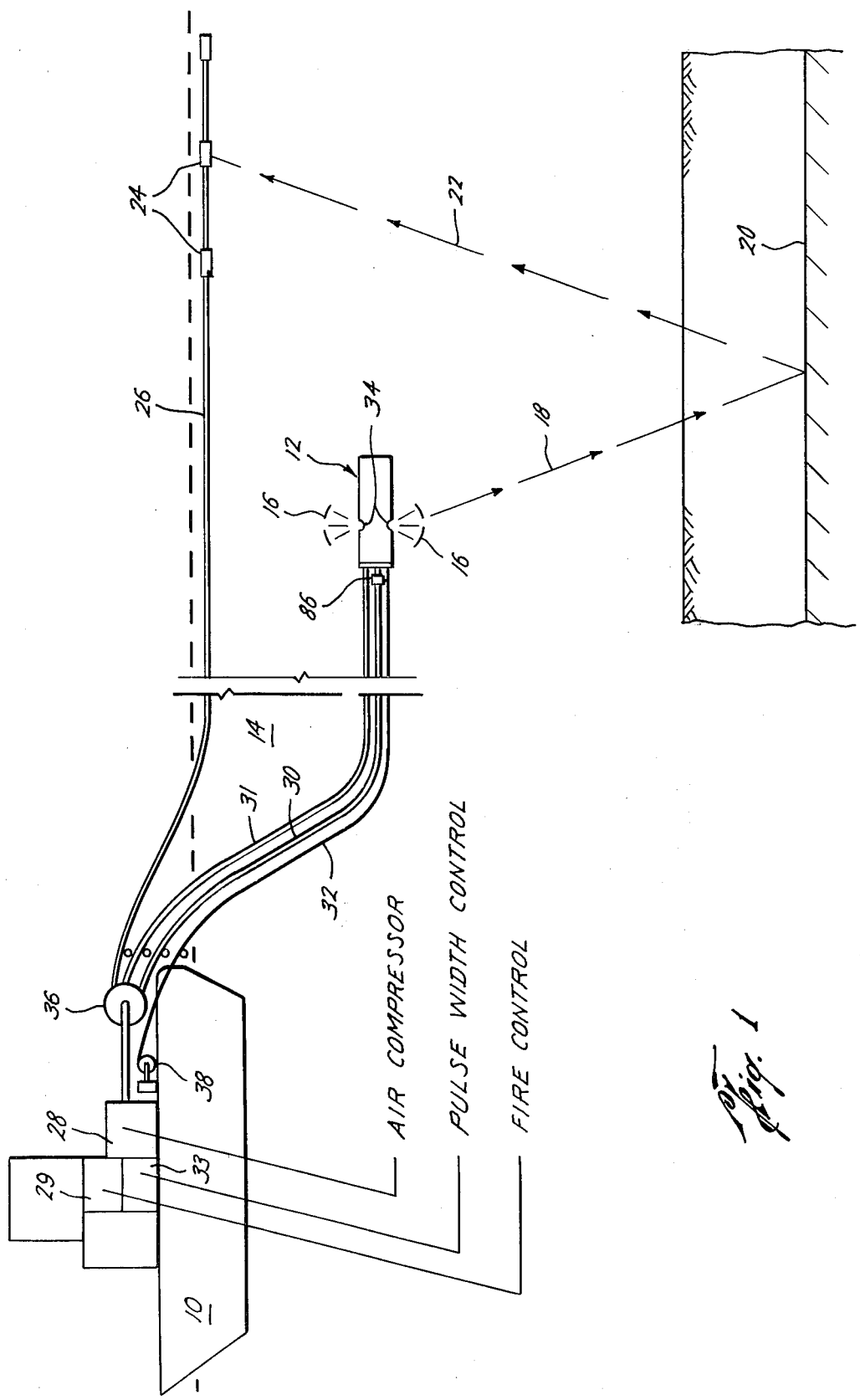
FIG. 1 is a schematic representation of the manner of using the invention for marine seismic exploration.

Referring to FIG. 1, a ship 10 tows a seismic signal generator in the form of an air gun 12 through a body of water 14. At desired locations, the air gun generates an acoustic pulse produced by releasing high-pressure air jets 16 into water 14. The acoustic pulse travels along ray path 18, is reflected from subsurface formation 20, and returns to the water surface along raypath 22. The reflected signals are detected by hydrophones 24 attached to a long streamer cable 26, also towed by ship 10. The detected reflected signals are transmitted to a seismic signal processor (not shown) aboard ship 10 through suitable conductors or a telemetric link (also not shown) in streamer cable 26.

Air compressor 28 in ship 10 feeds air at two different pressures to air gun 12 through hoses 30, 31. Hose 30 supplies control air under a relatively low pressure of a few hundred pounds per square inch; hose 31 conducts air, having a pressure of several thousand pounds per square inch, to the firing chamber of the gun (to be described below). Electrical cable 32 connects electrical triggering and sensing devices in the air gun to a fire-control unit 29 on ship 10. Fire control unit 29, triggers the gun to cause it to periodically emit air jet 16 into the water through exhaust ports 34.

When not in use, streamer cable 26 and hoses 30, 31 are stowed aboard ship 10 on cable reel 36. Cable 32 is stowed on reel 38 when the gun is idle.

FIG. 2 is a cross sectional view of air gun 12 in a presently preferred design. The gun consists of an elongated cylindrical casing 40, closed at its lower end by a cap 42. The upper end of the casing 40 is threadably closed by plug 44. The lower part 50 of plug 44 has a diameter less than the diameter of the threaded part 52 and defines an annular control chamber 54 between the inner wall 56 of casing 40 and the reduced diameter of the lower portion of plug 44. See also FIG. 4, a cross sectional view taken along line 4—4. A flange 46 at the top of plug 44, bears against O-ring 48 to seal the upper end of casing 40.

Casing 40 has one or more exhaust ports 34 which may be sealed by a sliding sleeve valve 58. The lower face 60 of sleeve valve 58 bears against a valve seat 62 associated with exhaust ports 34. Note that lower face 60 overhangs valve seat 62 by a small amount. The exact amount depends on the relative air pressures to be used. Seat 62 may be metal but is preferably machined from a hard plastic material such as Nylon or Teflon. Sleeve valve 58 may slide upwards into control chamber 54 to open exhaust ports 34 or it may slide downward against seat 62 to close exhaust ports 34. When sleeve valve 58 is closed, O-ring 64, 66 seal control chamber 54 from fluid communication with the environment external to gun 12. O-ring 68, 70 seal control chamber 54 from fluid communication with firing chamber 72 defined by the lower portion of casing 40. Sleeve valve 58 therefore divides casing 40 into control chamber 54 and firing chamber 72. An O-ring 73 seals firing chamber 72 from the external environment when sleeve valve 58 is closed.

FIG. 3 is a cross section of gun 12, FIG. 2, taken along line 3—3 to better show the positioning of air passageways 74 and 76.

FIG. 4 is a cross section of the gun of FIG. 2 taken along the line 4—4 to better show control chamber 54, high-pressure air passageway 76, and control-air passageway 74.

FIG. 5 is a cross section of gun 12 taken along line 5—5 to illustrate the configuration of sleeve valve 58 with respect to casing 40 and plug 44 as well as air passage 76.

Returning now to FIG. 2, high-pressure air under a pressure of about 3000 to 5000 psi is admitted to firing chamber 72 from air compressor 28, through high pressure hose 31 and passageway 76 in plug 44. Regardless of whether sleeve valve 58 is open or closed, a continuous supply of high pressure air is available to firing chamber 72.

Control air under a pressure of 200 to 1500 psi is fed from air compressor 28 through a separate hose 30, through a three-way, two-position, spring-loaded solenoid valve 86, L-shaped passageway 74, and into control chamber 54. When control chamber 54 is charged with a volume of control air, sleeve 58 is forced closed against seat 62 to seal exhaust ports 34.

The sleeve valve 58 is held closed because the force generated by the air pressure in control chamber 54 multiplied by the exposed area of the top face 88 of sleeve valve 58 is greater than the force acting on the small overhanging area of lower face 60 multiplied by the air pressure in firing chamber 72. Mathematically, the required downward closing force $-F_c$ is $$-F_c = A_{60} \times P_f - A_{88} \times P_c - K, \quad (1)$$

where the downward-acting force is considered negative, $A_{88}$ is the area of valve face 88 exposed to the control chamber pressure $P_c$, $A_{60}$ is the area of valve face 60 that is exposed to the firing chamber pressure $P_f$, and $K$ is an additional force that is necessary to create a seal between lower valve face 60 and seat 62. If seat 62 is metal, then the value of K must be considerably higher to create a metal-to-metal seal, than is necessary to create a metal-plastic seal. Accordingly, a plastic seat is preferred. For a metal-to-metal seal, K is on the order of 2000 pounds. For plastic, the value of K may be reduced substantially to well under 500 pounds.

The gun is fired by momentarily opening solenoid valve 86 to vent or dump the control air into the surrounding environment. Solenoid valve 86 is a commercially-available, three-way, two-position, solenoid-actuated valve with spring return such as model SV-431-532P8P43, available from the Circle-Seal/Victor distributor in Houston, Texas. FIG. 6 is a greatly simplified schematic cross section of valve 86. The valve essentially consists of a hollow body 89, a plunger 90 having an L-shaped bore 92 for communication with either air-inlet line 30 or dump line 94. Plunger 90 is normally held in the position shown by compression spring 96 to admit incoming air. To dump air from control chamber 54 (FIG. 2), an adjustable-length, square-wave triggering pulse is applied by fire-control unit 29 to solenoid 98 over conductor pair 100. Conductor pair 100 is integral with cable 32.

Upon receipt of the leading edge of a pulse, plunger 90 is withdrawn into the solenoid core, moving L-shaped bore 92 into fluid communication with air dump line 94 and temporarily sealing air inlet line 30. When solenoid coil 98 is activated, control air is vented through spring-loaded ball check valve 102. Solenoid coil 98 remains activated for the duration of the applied pulse which may be varied over a range of several tens of milliseconds by pulse width control circuit 33 which forms part of fire control unit 29. Because dump line 94 is generally underwater, check valve 102 is necessary to prevent water from invading valve 86. Solenoid coil 98 is nominally rated at 24V but for use with the air gun, an electrical pulse of 70 to 100 volts is used to insure positive, rapid opening of the valve. Because the pulse is very short, only a few milliseconds, there is no danger of damage to the solenoid itself due to the overvoltage.

In considering the operation of air gun 12, refer to FIGS. 1, 2, and 6. As discussed above, solenoid valve 86 remains in the rest or idle position unless a triggering pulse is applied to the solenoid. In the rest position, both control air and high-pressure air are continuously supplied to the control and firing chambers respectively. The control air holds sleeve valve 58 closed. When a fire command issues from fire control unit 29, solenoid valve 86 opens momentarily to dump the control air. With the pneumatic force against sleeve-valve face 88 removed, the force against the overhanging portion of valve face 60 abruptly forces sleeve valve 58 to move rapidly upwards into control chamber 54 and at substantially the same instant, solenoid valve 86 closes. Because of the presence of a metering orifice 104 in passageway 74, sleeve valve 58, due to its upward momentum, compresses whatever residual air remains in control chamber 54 faster than the air can escape through orifice 104. At the same time, a fresh charge of control air enters control chamber 54 because solenoid valve 86 has returned to the rest or idle position. The residual air in control chamber 54 compressed by the movement of valve 58 acts like a resilient compression spring and, in cooperation with the fresh control air, causes the sleeve valve to rebound back to the lower, sealing position. The residual-air spring further acts as a snubber to prevent face 88 of sleeve valve 58 from impacting the roof of the control chamber.

The effective resiliency of the compressed, residual-air spring is controlled by the size of metering orifice 104 and on the duration of the triggering pulse applied to the solenoid valve. With a large orifice, of course, the control air would so rapidly be vented, that there would be little or no residual air available to cushion the upward travel of the sleeve valve.

The mechanical principles that govern the opening and closing of sleeve valve 58 are incompletely understood. It has been found however that the actuation time of solenoid valve 86, the size of metering orifice 104, and the ratio of control air pressure to firing air pressure (which necessarily involves the magnitude of sealing force K, equation (1)), are critically dependent upon one another.

The size of metering orifice 104 controls the resiliency of the air spring in control chamber 54 and limits the opening rate of valve 58 when the pressure balance of equation (1) is upset. A smaller orifice creates a "stiffer" air spring, slows the valve opening rate, and reduces the effective area of the exhaust port at firing time since a stiffer air spring limits the upward travel of the valve. If the valve opens too slowly, the air in the firing chamber simply leaks out into the surrounding water without doing useful work. Additionally, the Bernoulli forces due to the air leaking between valve face 60 and seat 62 tend to close the valve, causing the valve to chatter against the seat. At the other extreme, if orifice 104 is too big, there will be no residual air left to absorb the momentum of valve 58; the valve will impact the roof of control chamber 54. The correct size of orifice is readily found for any specifice embodiment by testing a few selected orifice sizes. It has, for example, been found that if the control pressure is 500 psi, the firing pressure is 4000 psi, the ID of sleeve valve 58 is 2.25 in., the ID of valve seat 62 is 2.24 in., an orifice of 0.25 inch diameter gives satisfactory results.

The actuation time of solenoid valve 86 or the dump cycle time determines the length of time that control chamber 54 is open to ambient pressure. If the dump cycle time is too long, valve 58 will remain open or, depending upon the size of orifice 104, may recycle several times in an uncontrolled manner. If the dump cycle time is too short to upset the balance of forces across the valve faces, the valve will not open.

In summary, for correct operation, it has been found that at the beginning of a firing cycle, the magnitude of the sealing force K in the control chamber must be reduced very rapidly to allow the force on the firing-chamber side of the exhaust valve to quickly accelerate it upwards. The momentum of the valve overcomes the Bernoulli closing forces that exist when the valve first starts to open. A fast valve-opening rate allows the high pressure air in the firing chamber to be released impulsively to create the desired acoustic pulse. At the end of the firing cycle the compressive force of the air spring, the regeneration of the sealing force K by admission of a fresh supply of control air, and the Bernoulli forces created between the downward-moving valve face 60 and seat 62, all cooperate to close the valve.

The invention has been described in terms of a preferred embodiment but changes in the arrangement, size, or shapes of the various cooperating elements may be made without departing from the scope of this invention.

We claim:

1. An air gun for generating a seismic acoustic pulse in a body of water comprising:
    a casing closed at both ends and having at least one exhaust port;
    valve means, having two end faces, slidable within said casing, for dividing said casing into a control chamber and a firing chamber and for releasably closing said exhaust port, the end face exposed to the control chamber having a larger area than the end face exposed to the firing chamber when said valve is closed;
    means for sealing the control chamber from fluid communication with the firing chamber;
    means for supplying control air under a first relatively low pressure to said control chamber to cause said valve means to close said exhaust port, and separate means for supplying air under a second higher pressure to said firing chamber;
    means for dumping a metered volume of the air from said control chamber to allow said valve means to open said exhaust port thereby to allow the air in said firing chamber to escape impulsively into the water; and
    controllably resilient means in said control chamber for absorbing the momentum of said valve means.

2. The air gun defined by claim 1 wherein said valve is a sleeve valve.

3. The air gun as defined in claim 1 wherein:
    said dumping means includes a normaly-closed, solenoid-actuated air-release valve interconnected with said control chamber by an air passageway;
    an orifice having an opening of predetermined cross section in said passageway between said control chamber and said air-release valve;
    means for applying an electrical pulse to said solenoid to open said air-release valve; and
    means for varying the duration of said pulse to vary the open-time of said air-release valve to meter the desired volume of air to be dumped.

4. An air gun for generating seismic acoustic waves in a body of water comprising:
    a cylindrical casing closed at both ends and having at least one exhaust port;
    valve means, having two end faces, slidable within said casing, for dividing said casing into a control chamber and a firing chamber and for opening and closing said exhaust port, the end face exposed to the control chamber having a larger area than the end face exposed to the firing chamber;
    means, associated with said valve means, for sealing the control chamber from fluid communication with the firing chamber;
    means for pressurizing said control chamber with air to cause said valve means to close said exhaust port, and separate means for pressurizing said firing chamber with air at a pressure greater than the air in said control chamber;
    means for dumping a predetermined quantity of the pressurized air from said control chamber to allow said valve means to open said exhaust port to impulsively depressurize said firing chamber into said body of water; and
    resilient means in said control chamber for absorbing the momentum of said valve means and, in cooperation with a fresh supply of control air, for urging said valve means to close said exhaust port, thereby permitting said firing chamber to be repressurized.

5. An air gun for generating a seismic acoustic pulse in a body of water comprising:
    a casing closed at both ends and having at least one exhaust port;
    a control chamber and a firing chamber located within said casing;
    valve means movable within sid casing, and having two exposed faces located respectively in said control chamber and said firing chamber, for releasably closing said exhaust port, the end face exposed to the control chamber when said valve is closed having a larger area than the end face exposed to the firing chamber;
    means for sealing the control chamber from fluid communication with the firing chamber;

means for supplying control air at a first relatively low pressure to said control chamber to cause said valve means to close said exhaust port, and separate means for supplying air under a second higher pressure to said firing chamber;

means for venting at least some of the air from said control chamber to allow said valve means to open said exhaust port therby to allow the air in said firing chamber to escape impulsively into the water; and means having controllable resiliency for absorbing the momentum of said valve means.

* * * * *